US008817053B2

(12) United States Patent  (10) Patent No.: US 8,817,053 B2
Robert et al.  (45) Date of Patent: Aug. 26, 2014

(54) METHODS AND SYSTEMS FOR OPENING A FILE

(75) Inventors: Julien Robert, Paris (FR); Julien Jalon, Paris (FR)

(73) Assignee: Apple Inc., Cupertino, CA (US)

( * ) Notice: Subject to any disclaimer, the term of this patent is extended or adjusted under 35 U.S.C. 154(b) by 870 days.

(21) Appl. No.: 12/895,602

(22) Filed: Sep. 30, 2010

(65) Prior Publication Data

US 2012/0081375 A1 Apr. 5, 2012

(51) Int. Cl.
*G09G 5/00* (2006.01)
*G06F 3/048* (2013.01)

(52) U.S. Cl.
USPC ............................ 345/660; 715/781; 715/764

(58) Field of Classification Search
USPC ........... 345/660; 715/700, 764, 781, 784, 786
See application file for complete search history.

(56) References Cited

U.S. PATENT DOCUMENTS

| 5,303,388 | A | 4/1994 | Kreitman et al. |
| 5,404,316 | A | 4/1995 | Klingler et al. |
| 5,586,237 | A | 12/1996 | Baecker et al. |
| 5,831,617 | A | 11/1998 | Bhukhanwala |
| 5,960,448 | A | 9/1999 | Reichek et al. |
| 5,974,549 | A | 10/1999 | Golan |
| 6,006,227 | A | 12/1999 | Freeman et al. |
| 6,202,061 | B1 | 3/2001 | Khosla et al. |
| 6,215,523 | B1 | 4/2001 | Anderson |
| 6,262,732 | B1 | 7/2001 | Coleman et al. |
| 6,401,097 | B1 | 6/2002 | McCotter et al. |
| 6,519,568 | B1 | 2/2003 | Harvey et al. |
| 6,564,383 | B1 | 5/2003 | Combs et al. |
| 6,613,101 | B2 | 9/2003 | Mander et al. |
| 6,618,733 | B1 | 9/2003 | White et al. |
| 6,638,313 | B1 | 10/2003 | Freeman et al. |
| 6,654,754 | B1 | 11/2003 | Knauft et al. |
| 6,725,427 | B2 | 4/2004 | Freeman et al. |
| 6,760,721 | B1 | 7/2004 | Chasen et al. |
| 6,768,999 | B2 | 7/2004 | Prager et al. |
| 6,944,819 | B2 | 9/2005 | Banatwala et al. |

(Continued)

FOREIGN PATENT DOCUMENTS

WO  WO 99/49396 A1  9/1999
WO  WO 00/63766 A  10/2000

(Continued)

OTHER PUBLICATIONS

"Apple Tiger vs Windows Vista," Jun. 25, 2006, 3 pages.

(Continued)

*Primary Examiner* — Joni Richer
(74) *Attorney, Agent, or Firm* — Schwegman Lundberg & Woessner, P.A.

(57) ABSTRACT

Methods, systems, and machine readable tangible storage media that can provide for smooth and seamless opening of a file from, for example, a preview are described. A preview of a file can be generated by a non-native viewer or reader application and in response to a command to open a file in a native application, the preview can continue to be displayed while the native application launches such that a user will perceive no interruption in display of the content. The non-native application can pass a display state (e.g. a page number or scroll position) to the native application such that the native application continues to show a user's current position or view port into the file.

30 Claims, 14 Drawing Sheets

(56) References Cited

U.S. PATENT DOCUMENTS

| | | | |
|---|---|---|---|
| 7,051,288 B2* | 5/2006 | Bennett et al. | 715/781 |
| 7,085,761 B2 | 8/2006 | Shibata | |
| 7,143,102 B2 | 11/2006 | Fiennes et al. | |
| 7,146,388 B2 | 12/2006 | Stakutis et al. | |
| 7,159,188 B2* | 1/2007 | Stabb et al. | 715/787 |
| 7,162,466 B2 | 1/2007 | Kaasten et al. | |
| 7,162,488 B2 | 1/2007 | DeVorchik et al. | |
| 7,318,047 B1 | 1/2008 | Foth et al. | |
| 7,333,982 B2 | 2/2008 | Bakalash et al. | |
| 7,392,248 B2 | 6/2008 | Bakalash et al. | |
| 7,437,358 B2 | 10/2008 | Arrouye et al. | |
| 7,587,680 B2 | 9/2009 | Wada | |
| 7,647,278 B1 | 1/2010 | Foth et al. | |
| 7,657,603 B1 | 2/2010 | He et al. | |
| 7,689,933 B1 | 3/2010 | Parsons | |
| 7,730,047 B2 | 6/2010 | Hugill et al. | |
| 7,752,237 B2 | 7/2010 | Ray | |
| 2001/0028363 A1 | 10/2001 | Nomoto et al. | |
| 2002/0054017 A1 | 5/2002 | Agata et al. | |
| 2002/0140746 A1 | 10/2002 | Gargi | |
| 2003/0076322 A1 | 4/2003 | Ouzts et al. | |
| 2003/0093572 A1 | 5/2003 | Laux et al. | |
| 2003/0128242 A1 | 7/2003 | Gordon | |
| 2003/0156140 A1 | 8/2003 | Watanabe | |
| 2003/0189602 A1 | 10/2003 | Dalton et al. | |
| 2004/0095396 A1 | 5/2004 | Stavely et al. | |
| 2004/0150671 A1 | 8/2004 | Kamiwada et al. | |
| 2004/0230599 A1 | 11/2004 | Moore et al. | |
| 2005/0010860 A1 | 1/2005 | Weiss et al. | |
| 2005/0102373 A1 | 5/2005 | Grinberg | |
| 2005/0154716 A1 | 7/2005 | Watson et al. | |
| 2005/0246324 A1 | 11/2005 | Paalasmaa et al. | |
| 2005/0283739 A1 | 12/2005 | Mohr et al. | |
| 2005/0289482 A1 | 12/2005 | Anthony et al. | |
| 2006/0031357 A1 | 2/2006 | Misra et al. | |
| 2006/0074869 A1 | 4/2006 | Rosenberg et al. | |
| 2006/0085442 A1 | 4/2006 | Fujiwara | |
| 2006/0107207 A1 | 5/2006 | Wada | |
| 2006/0174214 A1 | 8/2006 | McKee et al. | |
| 2006/0195512 A1 | 8/2006 | Rogers et al. | |
| 2006/0195790 A1 | 8/2006 | Beaupre et al. | |
| 2006/0238835 A1 | 10/2006 | Nishida et al. | |
| 2006/0265417 A1 | 11/2006 | Amato et al. | |
| 2006/0280437 A1 | 12/2006 | Logan et al. | |
| 2007/0061306 A1 | 3/2007 | Pell et al. | |
| 2007/0061745 A1 | 3/2007 | Anthony et al. | |
| 2007/0070066 A1 | 3/2007 | Bakhash | |
| 2007/0136750 A1 | 6/2007 | Abanami et al. | |
| 2007/0143245 A1 | 6/2007 | Dettinger et al. | |
| 2007/0143493 A1 | 6/2007 | Mullig et al. | |
| 2007/0156669 A1 | 7/2007 | Marchisio et al. | |
| 2007/0189708 A1 | 8/2007 | Lerman et al. | |
| 2007/0266411 A1 | 11/2007 | Yamamoto et al. | |
| 2008/0021921 A1 | 1/2008 | Horn | |
| 2008/0033919 A1 | 2/2008 | Arrouye et al. | |
| 2008/0034306 A1 | 2/2008 | Ording | |
| 2008/0034325 A1 | 2/2008 | Ording | |
| 2008/0034381 A1 | 2/2008 | Jalon et al. | |
| 2008/0062141 A1 | 3/2008 | Chandhri | |
| 2008/0115182 A1 | 5/2008 | van Willigenburg | |
| 2008/0307343 A1 | 12/2008 | Robert et al. | |
| 2008/0307350 A1 | 12/2008 | Sabatelli et al. | |
| 2008/0307363 A1 | 12/2008 | Jalon et al. | |
| 2009/0099919 A1* | 4/2009 | Schultheiss et al. | 705/14 |
| 2009/0106674 A1 | 4/2009 | Bray et al. | |
| 2009/0112719 A1 | 4/2009 | Bhave et al. | |
| 2009/0125842 A1 | 5/2009 | Nakayama | |
| 2009/0150769 A1 | 6/2009 | Konnola et al. | |
| 2009/0150792 A1 | 6/2009 | Laakso et al. | |
| 2009/0249210 A1 | 10/2009 | Sheldon et al. | |
| 2009/0300540 A1 | 12/2009 | Russell | |
| 2010/0027055 A1* | 2/2010 | Mori | 358/1.15 |
| 2013/0124955 A1* | 5/2013 | Goel et al. | 715/209 |

FOREIGN PATENT DOCUMENTS

| | | |
|---|---|---|
| WO | WO 2005/121920 | 12/2005 |
| WO | WO 2006/032442 A | 3/2006 |
| WO | WO 2007/005789 A | 1/2007 |
| WO | WO 2008/019113 | 2/2008 |
| WO | WO 2008/153646 A1 | 12/2008 |
| WO | WO 2008/153647 A1 | 12/2008 |

OTHER PUBLICATIONS

Apple, "Quick Look Programming Guide—Data Management: File Management,"XP007915043, Jul. 20, 2009, pp. 1-50.

Apples iTunes 7 CNET Editors' Review, Sep. 15, 2006, 6 pages.

Cody, Hinze, "CoverFlow—A beautiful way to browse your MP3s", NOISE blog, http://noise.typepad.com/noise_blog/2006/02/cover_flow_the_.html, Feb. 5, 2006, 2 pages.

Dowdy, Thomas, et al., U.S. Appl. No. 60/843,832, filed Sep. 11, 2006, 68 pages (specification and drawings).

Engst, Adam C., "iPhoto 6 for Mac OS X: Visual QuickStart Guide," Peachpit Press, Jun. 20, 2006, pp. 9, 45, 50, 100, 105, 122, and 144-146.

Enright, Andrew Coulter, "Dissatisfaction Sows Innovation", The Treehouse + The Cave, http://thetreehouseandthecave.blogspot.com/2004/12/dissatisfaction-sows-innovation.html, Dec. 29, 2004, 6 pages, Bushwick, Brooklyn.

Enright, Andrew Coulter, "Dissatisfaction Sows Innovation", The Treehouse + The Cave, http://thetreehouseandthecave.blogspot.com/2004/12/dissatisfaction-sows-innovation.html, Jun. 15, 2006, Bushwick, Brooklyn. 18 pages.

Enright, Andrew Coulter, The Fliptych Interface, The Treehouse + The Cave, Aug. 6, 2006, 2 pages.

Imran Chandri, U.S. Appl. No. 60/937,986, filed Jun. 29, 2007, 72 pages (specification).

Microsoft Corporation, "Creating Windows XP Icons," Jul. 2001, 12 pages.

Microsoft Corporation, "How to Modify your Folder View Settings or to do a Custom Folder", Apr. 27, 2004, 5 pages.

Office Action dated Aug. 13, 2010 for U.S. Appl. No. 11/876,750, entitled "Previewing User Interfaces and Other Aspects" filed Oct. 22, 2007, 8 pages.

Office Action dated Jan. 13, 2011 for U.S. Appl. No. 11/876,750, entitled "Previewing User Interfaces and Other Aspects" filed Oct. 22, 2007, 11 pages.

Office Action dated Nov. 19, 2010 for U.S. Appl. No. 12/189,673, entitled "Browsing or Searching User Interfaces and Other Aspects" filed Aug. 11, 2008, 21 pages.

Office Action dated May 26, 2010 for U.S. Appl. No. 12/189,673, entitled "Browsing or Searching User Interfaces and Other Aspects" filed Aug. 11, 2008, 18 pages.

Office Action dated May 28, 2009 for European Patent Application No. 07836525.1-2201, 4 pages.

Office Action dated Apr. 29, 2010 for U.S. Appl. No. 11/760,759, entitled "Browsing or Searching User Interfaces and Other Aspects" filed Jun. 9, 2007, 16 pages.

Office Action dated Dec. 3, 2010 for U.S. Appl. No. 11/760,760, entitled "Browsing or Searching User Interfaces and Other aspects" filed Jun. 9, 2007, 19 pages.

Office Action dated Nov. 5, 2010 for U.S. Appl. No. 11/760,759, entitled "Browsing or Searching User Interfaces and Other Aspects" filed Jun. 9, 2007, 21 pages.

Office Action dated Jan. 6, 2010 for U.S. Appl. No. 11/760,761, entitled "Browsing or Searching User Interfaces and Other Aspects" filed Jun. 9, 2007, 12 pages.

Office Action dated Dec. 8, 2010 for U.S. Appl. No. 12/189,668, entitled "Browsing or Searching User Interaces and Other Aspects" filed Aug. 11, 2008, 21 pages.

Office Action dated Jul. 8, 2010 for U.S. Appl. No. 11/760,761, entitled "Browsing or Searching User Interfaces and Other Aspects" filed Jun. 9, 2007, 14 pages.

Ording, Bas, et al., "Methods and Apparatuses for Operating a Data Processing System," U.S. Appl. No. 10/873,661, filed Jun. 21, 2004 (92 pages).

(56) References Cited

OTHER PUBLICATIONS

PCT International Search Report and Written Opinion for PCT International Appln No. PCT/US2008/005900 mailed Aug. 1, 2008. (14 pages).
PCT International Preliminary Report on Patentability and Written Opinion for PCT International Appln No. PCT/US2008/005900 mailed Dec. 23, 2009. (8 pages).
PCT International Search Report and Written Opinion of the International Searching Authority for PCT/US2008/005901 dated Sep. 11, 2008, 14 pages.
PCT Notification of International Preliminary Report on Patentability and Written Opinion of the International Searching Authority for PCT/US2008/005901 dated Dec. 23, 2009, 9 pages.
PCT Notification of Transmittal of the International Search Report and the Written Opinion of the International Searching Authority, or the Declaration for PCT/US2010/042606 dated Oct. 5, 2010, 13 pages.
PCT Search Report and Written Opinion for PCT/US2007/017424, mailed Feb. 4, 2008, 9 pages.
Ricadela, Aaron, "New Windows Era," InformationWeek, Aug. 1, 2005, 3 pages.
"Screenshots from iTunes 4.1 running on Windows XP" Internet Citation, XP002486348, Oct. 5, 2005, pp. 1-17.
U.S. Appl. No. 60/878,746, filed Jan. 5, 2007, titled "Electronic Device With Image Based Browsers", by inventors Thomas Dowdy, David Heller and Anne Jones, 98 pages (specification and drawings).
"Windows Media Player 11—The OTHER Album Art Aware App.," May 11, 2006, 4 pages.
Zaitseff, John, "Sample Page for File-type Icons," Nov. 16, 2006, 2 pages.
Slide Show www.digitalphotoslideshow.com/doc/configure.htm archived May 24, 2005, 1 page.
Perry, Greg, "Sams Teach Yourself Windows® XP All in One Second Edition," Dec. 17, 2004, Print ISBN-13: 978-0-672-32728-5, Web ISBN-13: 978-0-7686-8357-8, pp. 93-96.
Office Action dated Jun. 22, 2011 for U.S. Appl. No. 11/760,759, entitled "Browsing or Searching User Interfaces and Other Aspects" filed Jun. 9, 2007, 20 pages.

* cited by examiner

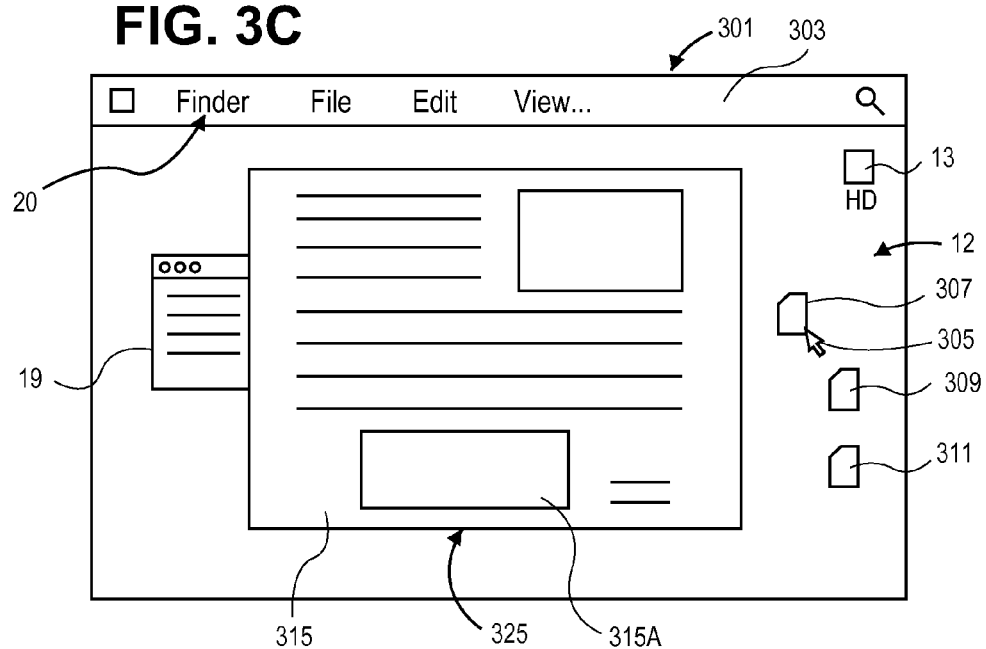
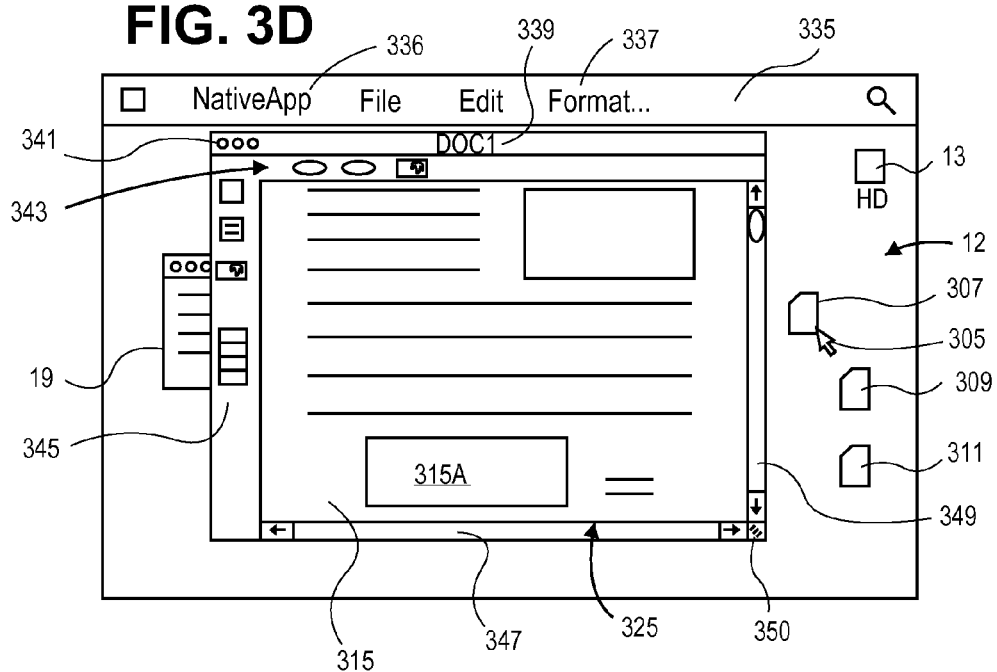

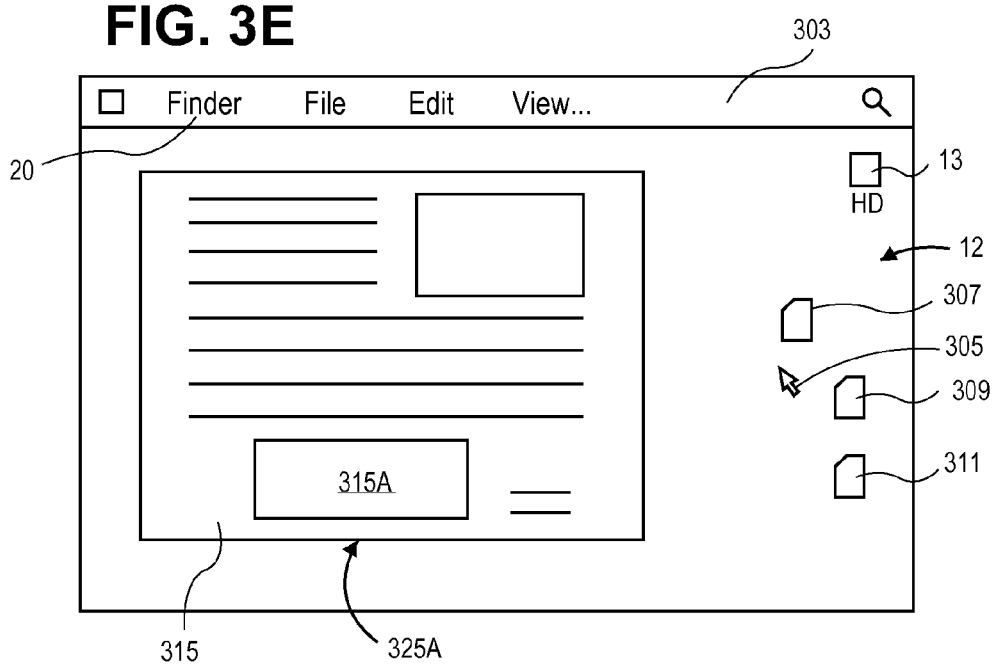
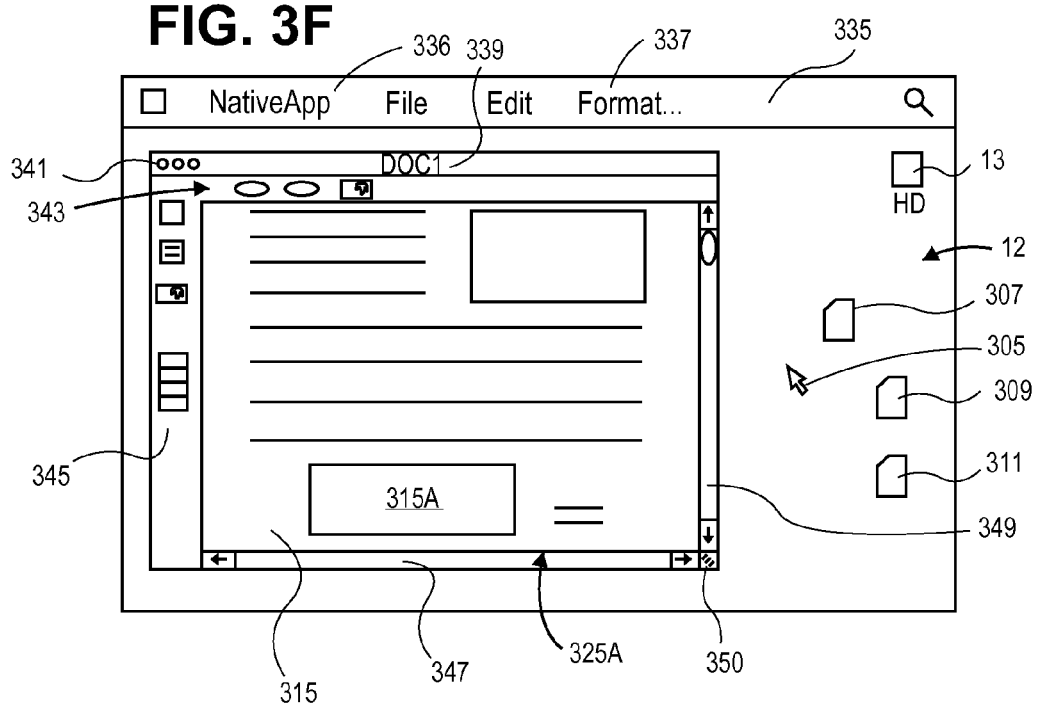

METHODS AND SYSTEMS FOR OPENING A FILE

BACKGROUND OF THE INVENTION

At least certain data processing systems currently allow a user, on the one hand, to open a file to edit or create the file, such as a word processing document, in a native application and on the other hand, to view the file in a non-native "viewer" application which cannot normally create or edit the file. The application which created the file can be considered or referred to as a native application. FIGS. 1A and 1B show an example of a data processing system, such as a computer or other consumer electronic device, which can either open a file, such as a word processing file or an image file, etc. or provide a preview of the file without requiring the launching of the application which created the file or which can edit the file. The Quick Look feature of the Macintosh operating system from Apple Inc. of Cupertino, Calif. is an example of a non-native application that can provide a preview of a file. FIG. 1A shows an example of a user interface which can be displayed on a display screen 10 of the data processing system. The user interface can include at least one menu bar 11 which can include a program menu 20, search request icon 21, and other menus to allow a user to select various options or commands from the user interface. A desktop 12 can be similar to desktops on modern computer systems, such as those provided by the operating systems known as Mac OS X or Microsoft Windows 7, etc. The desktop 12 can include a storage icon 13 and one or more icons for user files, such as icons 14 and 15. The user can cause the system to store the icons so that they can be seen on the desktop or can store the files within folders which can be viewed in one or more windows, in one embodiment, such as the window 19 which in one embodiment can be a window provided by the Finder program from Apple Inc. of Cupertino, Calif. The Finder program is a user interface program for a file management system on the Mac OS X operating system.

In this prior art system, a user can select a file, such as the file on the desktop or a file within a window and then cause the system to display a preview of the file without launching the native application which created or can edit the file. For example, the user can select an icon on the desktop or an icon or name within a window and then press the space bar key or select a preview command from a pop-up menu to cause the presentation of the preview of the file in a preview panel 16 which includes the content 20 of the file within the preview panel 16. The preview panel can include a resize icon 18, allowing the user to resize the preview panel, which can behave somewhat like a window, and the preview panel 16 can include a close icon 17 which allows a user to close the window by selecting close icon 17. Further, preview panel 16 can include a preview top bar 17A which can allow a user to control the position or movement of preview panel 16 by selecting the preview top bar and by indicating a movement of the preview top bar (e.g. with a cursor or a touch interface, etc.). The use of the preview panel may be faster than launching the application to view the file, so a user may desire to use the preview function before deciding to launch the application to see the file within a native application which can create or edit the file. If the user wants to launch the native application, then the user can enter a command, such as a double-click action within the preview panel or some other gesture to indicate to the system that the native application is to be launched. The result of launching the native application is shown in FIG. 1B.

The process of launching the native application and loading or opening the file includes removing the preview panel 16 from the display screen 10 and then displaying any splash screen of the native application and then loading user interface elements, such as menu bar 24 and other user interface features, and then showing the content of the file within application window 25 which is a window controlled by the Text Edit program as shown by program menu 22 in the menu bar 24. The process of opening the file in the prior art can be distracting to a user because the content of the file, originally displayed within preview panel 16, is removed from the display in response to a command to open the file and then user interface elements of the launch program begin to appear and at some point in time the content of the file reappears with all of the user interface elements of the launched application surrounding the content. Thus, the user's focus is taken away from the content while the application launches itself and loads or opens the file. In some instances, it can take several seconds for the launch process to occur, and this time diverts the user's attention from the content of the file to other images.

SUMMARY OF THE DESCRIPTION

This application relates to one or more methods and systems for opening a file, and in particular, in one embodiment, for opening a file after presenting the file in a preview or reader mode. According to one embodiment, a method can include receiving a command to display a preview of a file and displaying the preview in response to the command in a non-native application, and after the preview is displayed, receiving a command, while displaying or otherwise presenting the preview, to open the file in a native application. After receiving the command to open the file, the preview of the content of the file continues to be presented. The preview of the file, which is displayed after receiving the command to open the file, is displayed while processing the command to open the file and before loading of the application is completed. The displaying of the preview in this manner can occur without user perceptible interruption, such that the opening of the file is seamless to the user in the sense that the user is presented with the content of the file without user perceptible interruption. In one embodiment, the initial preview provided by the non-native application can be a first preview and the preview presented after receiving the command to open the file can be a second preview which is an enlarged version of the first preview or a version of the content generated by the native application, such as a snapshot of the content saved when the file was last closed. The method can also include suppressing a splash screen which would otherwise cover the representation of the content or second preview of the content, and the method can also include passing a display state of the preview from the non-native application to the native application, wherein the display state can indicate a viewing position on the content of the file. In one embodiment, the display state can also indicate a size of the preview panel or window, and the native application can use this size to determine the size of its window to display the content of the file. For example, the display state can specify that the preview was displayed in full screen mode, and the native application can automatically and directly open a window to display the content of the file in full screen mode (so that this window occupies the full screen of the display). In another example, the display state can specify the size and position of the preview window or panel and the native application can optionally use the size and position information to open its window in the same size and position (or use the size and position as a hint to open its window with a similar, but not same, size and position). The non-native application can be configured to display content of a plurality of different file types, including picture files, text files, movie files, spreadsheet files, PowerPoint slide files, but the non-native application cannot normally edit or create content of the plurality of file types.

In another embodiment, a method of the present invention can include displaying, in a user interface of a file management system such as the Finder program from Apple Inc. or Windows Explorer from Microsoft, at least one of an icon and a name of a file and receiving, from the user interface, a command to open the file in a native application and displaying, in response to the command, the content of the file by a non-native application in a first border or no border, while the native application is being launched to open the file. The content can be displayed by the non-native application before user interface elements of the native application are displayed, and the border or no border can be replaced by a user interface of a window of the native application after the native application has been launched. The border provided by the non-native application, in one embodiment, will not include scroll controls. In one embodiment, the displaying of the content of the file occurs while processing of the command to open the file and hence the display of the content by both the non-native application and the native application occurs, over time, seamlessly from a user's perspective because there is no interruption of the presentation of the content of the file after the preview of the content by the non-native application has been presented by the non-native application.

In another embodiment, a method according to the present invention can include displaying a file in a preview mode by a non-native application, wherein the file is displayed in a display state, which represents or indicates a viewable portion of the file in the preview mode. The method can further include receiving a command to open the file in a native application and passing the display state in the preview mode from the non-native application to the native application, and displaying the file in the native application based on the display state which can indicate a viewable portion of the file in the preview mode. For example, if the user was looking at page 2 of the file in the preview mode through the non-native application, the native application, after opening the file, will display the file at page 2 rather than page 1 in one embodiment. The display state can include at least one of a page number, a scroll position, or a movie frame number or movie time or other parameters or indicators of a viewable portion of the file and can also include the preview's size (size of window or panel of the preview) and position. The passing of the display state can occur in response to the command to open the file. In one embodiment, the file is displayed in the preview mode in response to a first input, and the command to open the file is invoked by a second input which is different than the first input. In one embodiment, the content of the file cannot be created or edited by the non-native application, and, in one embodiment, the non-native application can be a user interface program for a file management system, such as the Finder or Windows Explorer from Microsoft.

Systems, methods and machine readable tangible storage medium, such as DRAM, flash, hard disk drives, or other magnetic media, etc. can provide for seamless and smooth opening of a file as described further herein.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIGS. 3A, 3B, 3C, and 3D represent a sequence of the user interface provided by at least one embodiment of the present invention; FIGS. 3E and 3F show examples of user interfaces of an alternative embodiment of the present invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2010.

Figure 1A:
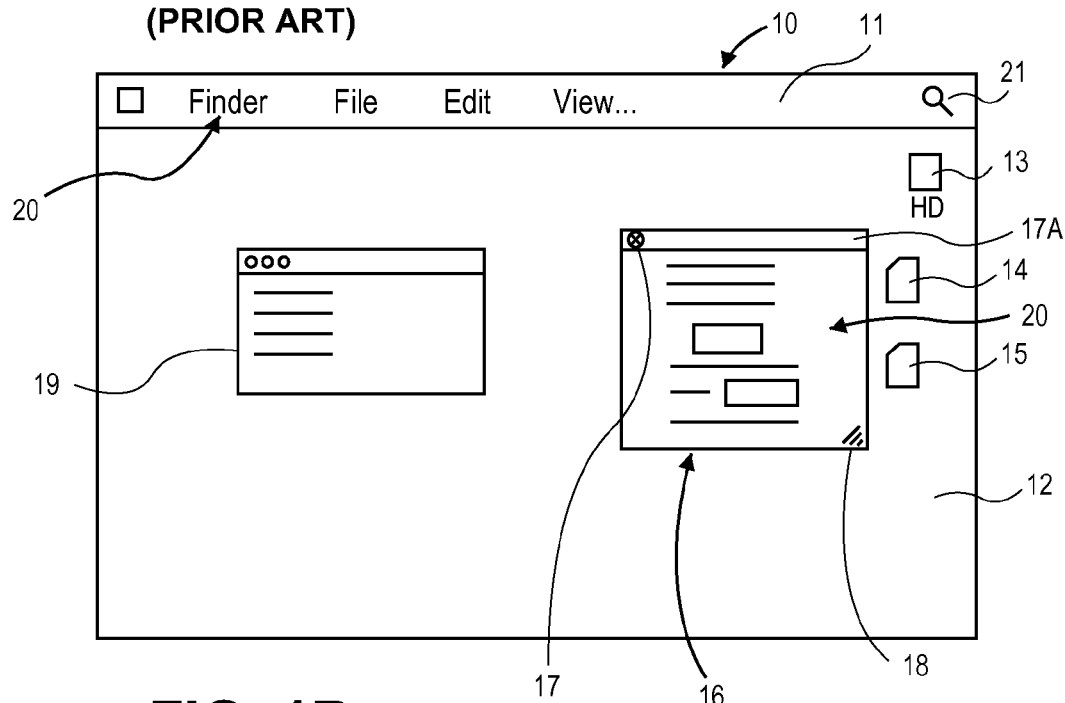
FIGS. 1A and 1B show examples, in the prior art, of user interfaces for showing a preview of a file or showing the file after it has been opened in a native application.
Figure 1B:
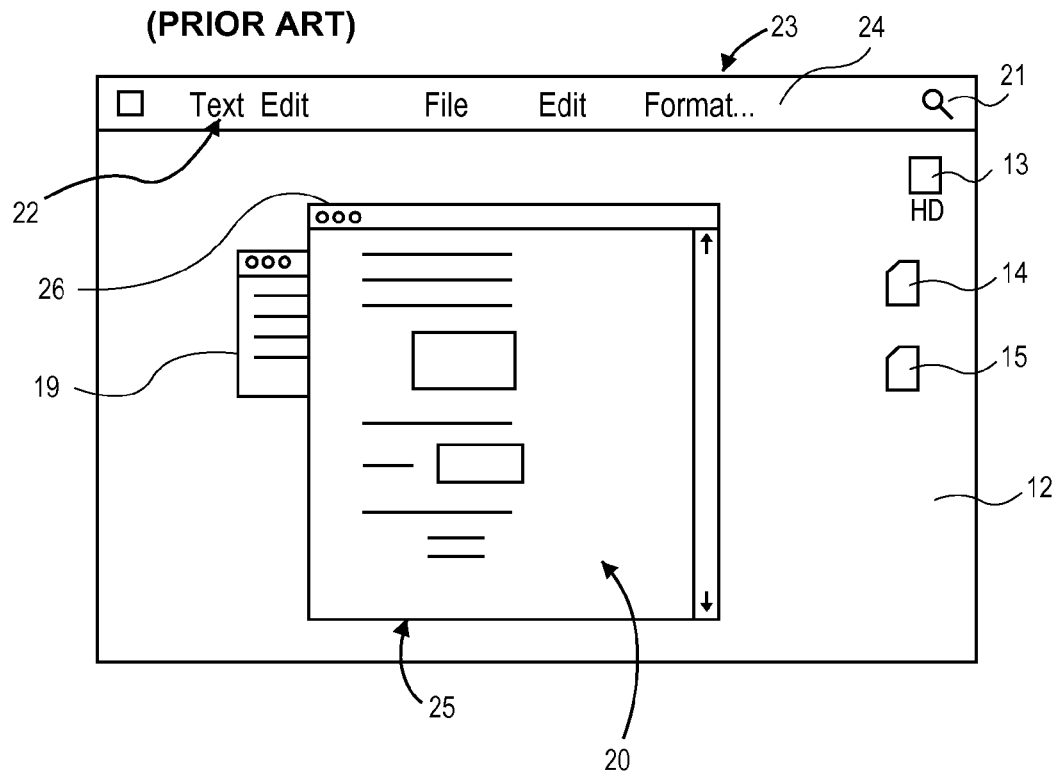
Figure 2A:
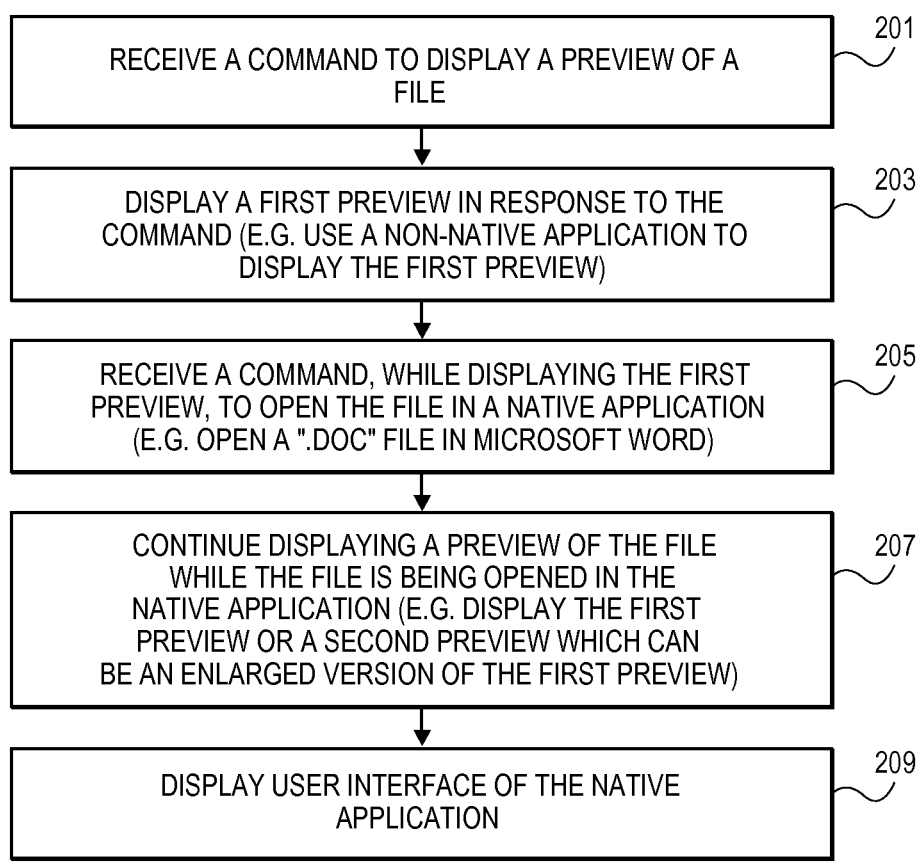
FIGS. 2A, 2B, and 2C are flow charts depicting several embodiments of the present invention.
Figure 2B:
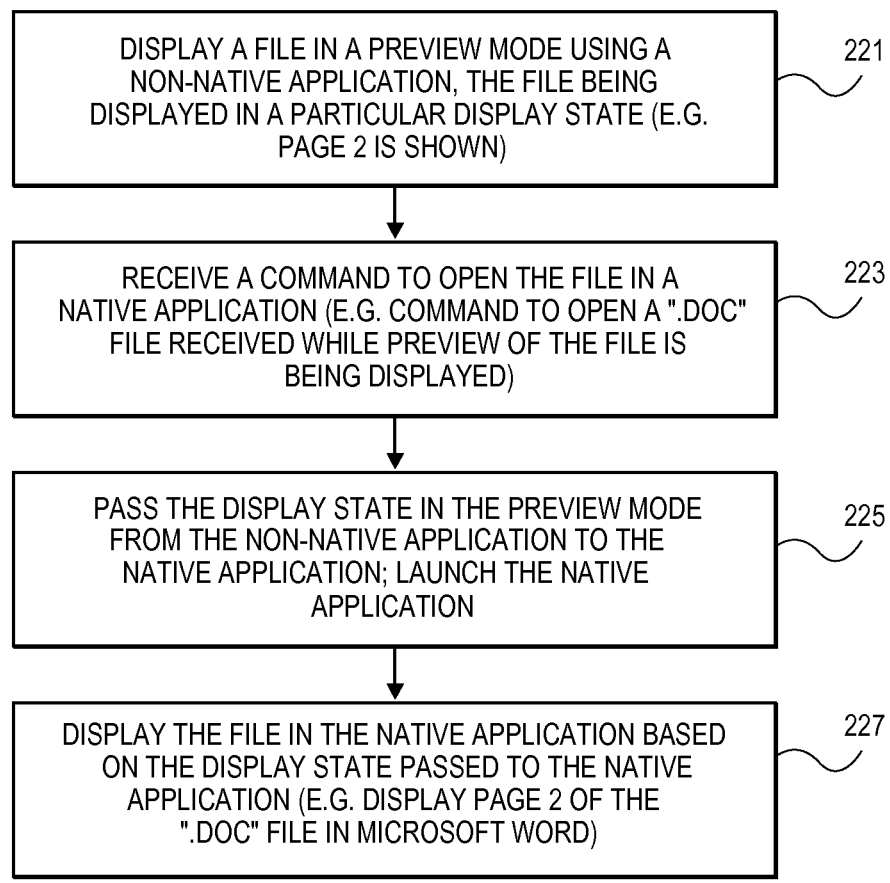
Figure 2C:
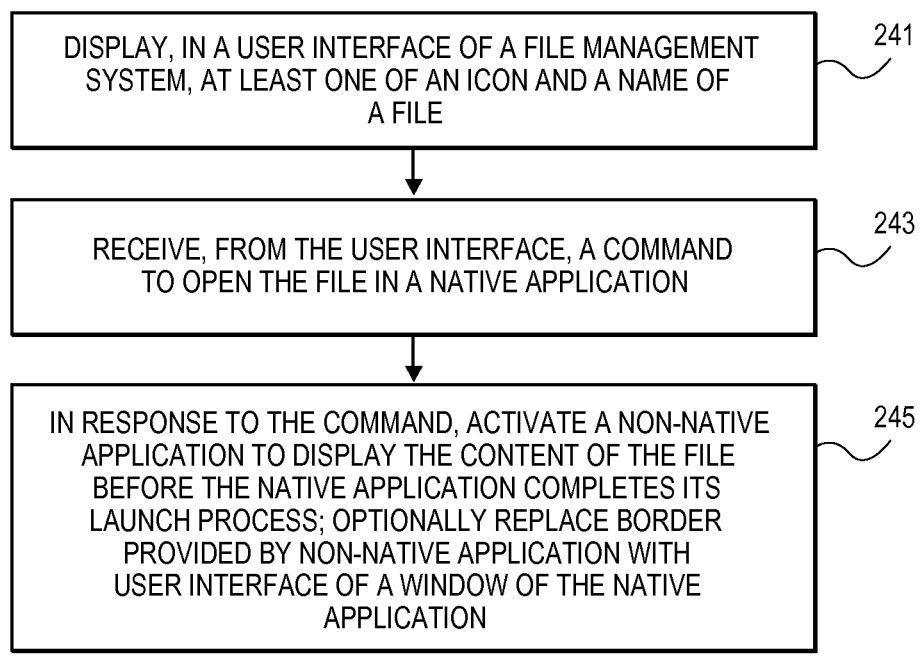

At least certain embodiments of the present invention can provide methods, systems, and machine readable tangible storage media that can provide for smooth and seamless opening of a file from, for example, a preview or from a user interface program for a file management system such as the Finder program from Apple Inc. of Cupertino, Calif. A preview of a file can be generated by a non-native viewer or reader application and, in response to a command to open the file in a native application, the preview can continue to be displayed while the native application launches such that the user will perceive no interruption, after the command to open the file, in display of the content in one embodiment. The non-native application can pass a display state, such as a page number or scroll position, to the native application such that the native application continues to show a user's current position or view port, in the preview mode, into the file and in some embodiments the non-native application can also pass the preview panel's size and screen position to the native application as described above. FIGS. 2A, 2B, and 2C show various aspects of one or more embodiments of the present invention.

The method shown in FIG. 2A can begin in operation 201 in which a command is received to display a preview of a file. In one embodiment, a user may select a file from a desktop or a folder or a window in a file management system using a cursor and a mouse or using a touch input device, such as a direct input touch screen, using either a stylus or the user's finger to select the file. The selection can also include the command with a gesture in a touch interface or a further operation can be used such as, for example, pressing a button (e.g. the space bar button on a keyboard) or selecting a preview command from a pop-up menu or a pull-down menu or other menus or tool palettes. The method can continue in operation 203 in which a first preview is displayed or otherwise presented in response to the command. In one embodiment, the preview is presented by a non-native application which presents the preview. The non-native application can be configured as a viewer or reader which can only present or display the content but cannot edit or create the content. A software architecture to use such a viewer or reader is described in conjunction with FIG. 6 below. In another embodiment, the preview could be created by a native application which can create or edit the content; in this embodiment in which the native application presents the preview, the native application may do so without presenting any of the user interface of the native application, such as menus in a menu bar, tool palettes, and other controls normally provided in the user interface of the native application and may do so by capturing a snapshot of the window at the last close of the window containing the content of the file.

The method can continue in operation 205 in which a command is received, while displaying or otherwise presenting the first preview, to open the file in a native application. For example, if the native application is a .doc file which is a Microsoft Word file, then Microsoft Word will be launched in order to open the file. A user may activate the command by double-clicking within the preview panel or window or by double-clicking on the icon of the file or the file name of the file or by other methods known in the art to generate a command to open a file. Then in operation 207, the method will continue to display a preview of the file while the file is being opened in the native application. This is unlike the prior art in which the preview is removed or closed from the display, in response to the open command, while the native application is being launched and the file is being opened. The preview which is generated in operation 207 can, in one embodiment, be an enlarged version of the initial preview and may be moved on the display screen relative to the initial preview. Several examples are provided further below in connection with FIGS. 3A-3F.

Continuing with FIG. 2A, operation 209 displays the complete user interface of the native application after the native application has completed its launch process and the content of the file is now displayed within a window of the native application. In one embodiment, the displaying of the initial preview or first preview and the displaying of the preview, such as the second preview, during the launching of the native application and the opening of the file within the native application, can occur seamlessly such that there is no substantial interruption from the user's perspective. For example, in one embodiment there may be no substantial user perceptible interruption in the display of the content of the file, although more of the content may be shown when the window is enlarged and the content may be moved on the display during the launch process, such as the process of operation 207 in FIG. 2A. The method can also include suppressing a splash screen which would otherwise cover the representation of the content, such as the first or the second preview. The method can also include passing a display state of the first preview from the non-native application to the native application, wherein the display state can indicate a view port or viewing position on the content of the file, such as a page number, a scroll position, a zoom value, a movie frame number or movie time, etc. and can also optionally indicate a window/panel size or position for the preview as described above. In one embodiment, the first preview can have a first border or no border that is replaced by a window frame of the normal user interface of the native application.

FIG. 2B shows another example of a method according to another embodiment of the present invention. The method of FIG. 2B can begin in operation 221 in which the content of a file is displayed or otherwise presented in a preview mode using a non-native reader application, such as an application which cannot edit or create the content of the file. The non-native application can, however, allow for the user to view different portions of the file, such as different pages, or different scroll positions, or different times in a movie, etc. and these different portions can be represented by a display state which is the data that describes the view port or position within the file of the current view in the preview mode. For example, the display state may indicate that the current portion of the file being viewed in the preview mode is page 2 of the file. In operation 223, a command can be received to open the file in a native application, which is an application which can edit or view or both edit and view the contents of the file. For example, if the file is a .doc file, then the native application is Microsoft Word, but other applications, such as Text Exit, Pages from Apple Inc. and other word processing programs can also open the file and edit and/or create such files. While the file is being opened, the non-native application can, in operation 225, pass the display state stored or retained in operation 221 from the non-native application to the native application. In one embodiment, the passing of the display state (in the last use of preview mode for the file) can occur whether or not the preview of the content of the file is currently being displayed. The passing of the display state can occur through one or more APIs which are described below. For example, the application which is being launched (e.g. a native application) can request through an API that the non-native application pass the display state to the native application so that the native application can display the content of the file at the same position or display state as the file was last displayed in the preview mode. Also, in some embodiments, the display state can include a size or position (or both) of the preview's panel or window, and the native application can, as described herein, use the same (or similar) size for its window to display the content of the file. This can occur in operation 227 as shown in FIG. 2B. For example, if the file was last shown at page 2 in the preview mode, then the file, after it is opened in the native application, will also show page 2 of the content of the file, which is unlike the prior art which will open at page 1 or at an initial position or default position rather than a position last used by the user in the preview mode. The passing of the display state can occur in response to the command to open the file, in one embodiment, and the file can be displayed in the preview mode in response to a first input, and the command to open the file can be invoked by a second input which is different than the first input. In one embodiment, the non-native application which provides the preview of the content of the file can be a user interface program for a file management system, such as the Finder from Apple Inc. or the Windows Explorer program from Microsoft of Redmond, Wash. or similar programs on other systems.

FIG. 2C shows an example of another embodiment of the present invention. This embodiment can employ a user interface program of a file management system such as the Finder from Apple Inc. or Windows Explorer or other user interface programs which provide a user interface for a file management system on a computer or other data processing system. The method can begin in operation 241 in which an icon or a name of the file is displayed in the user interface program of the file management system. Then a command can be received in operation 243 to cause the file to be opened in a native application. In response to the command, in operation 245, the data processing system can activate a non-native application to display or otherwise present the content of the file before the native application completes its launch process. In one embodiment, an optional border can be provided by the non-native application, which optional border can be replaced with the user interface of a standard window of the native application after the native application has completed its launch process and has opened the file. In one embodiment, the content of this file is displayed by the non-native application before any user interface elements of the native application are displayed. In one embodiment, the content of the file presented by the non-native application before the native application completes its launch process can be totally devoid of any controls, such as scroll controls, etc. In one embodiment, the displaying of the content of the file by the non-native application can provide a seamless presentation of the display of the content from virtually immediately after requesting the file to be opened by presenting the content of the file immediately through the non-native application while the native application begins and completes its launch process; in other words, as soon as the non-native application presents the content of the file, the content of the file may remain presented or otherwise displayed during the entire launch process.

Figure 3A:
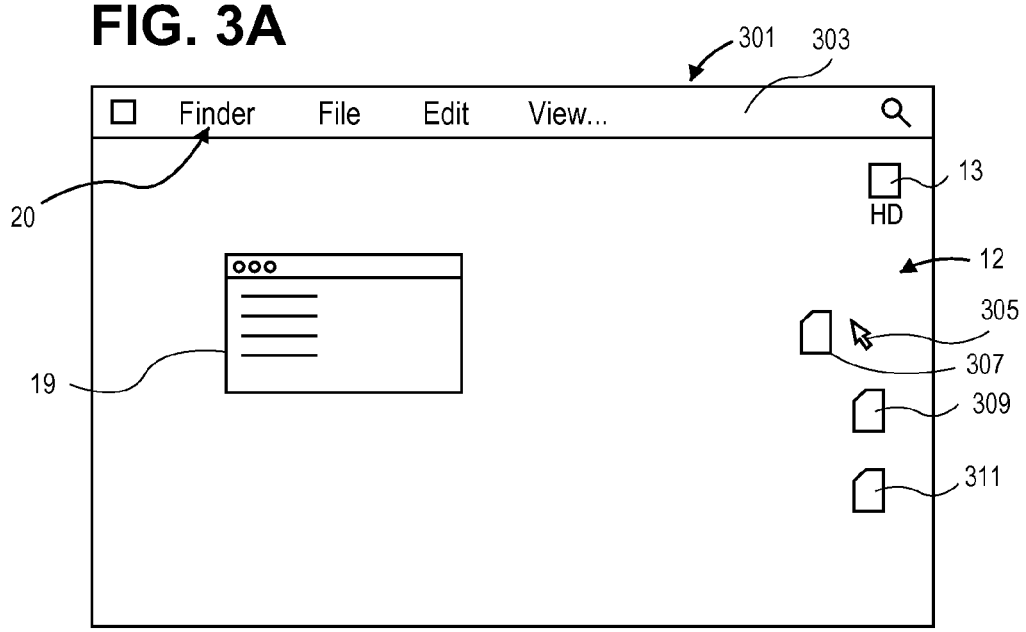

FIGS. 3A, 3B, 3C, and 3D represent one embodiment of the method shown in FIG. 2A. Similarly, FIGS. 3A, 3B, 3E, and 3F, when viewed in sequence, represent another embodiment of the method shown in FIG. 2A. Each of these figures show an example of a user interface presented on a display screen such as a liquid crystal display device or other display devices. Display screen 301 can include one or more menu bars 303 which typically include a plurality of selectable menus such as program menu 20 which can be implemented as a pull-down menu as is known in the art. Display screen 301 can also include a desktop 12 on which several icons which represent files are displayed. In addition, one or more windows for one or more programs can also be displayed on the desktop 12. While FIG. 3A shows only one window 19 which could be a window for the Finder program which is a user interface program for a file management system, it will be appreciated that other windows for the Finder application program or other programs could also be displayed concurrently on display screen 301. Window 19 could be a Finder window displaying names of files or icons of files or both names and icons for each file. A user may be able to select a particular file to open the file or to cause a preview to be displayed of the file. The selection may occur through the use of a cursor, controlled by a cursor control device such as a mouse or trackpad, or through the use of a touch screen with a stylus or user's finger to interact with the touch screen as is known in the art. In the example shown in FIG. 3A, a cursor 305 is displayed on the desktop 12 and can be used to select, in one embodiment, any one of the icons 307, 309, or 311, which represent files maintained by a file management system. The Finder program provides a view for a user into that file management system so a user can find and operate on one or more different types of files, such as word processing files, spreadsheet files, movie files, slide presentation files, PowerPoint files, HTML files, XML files, PDF files, etc.

Figure 6:
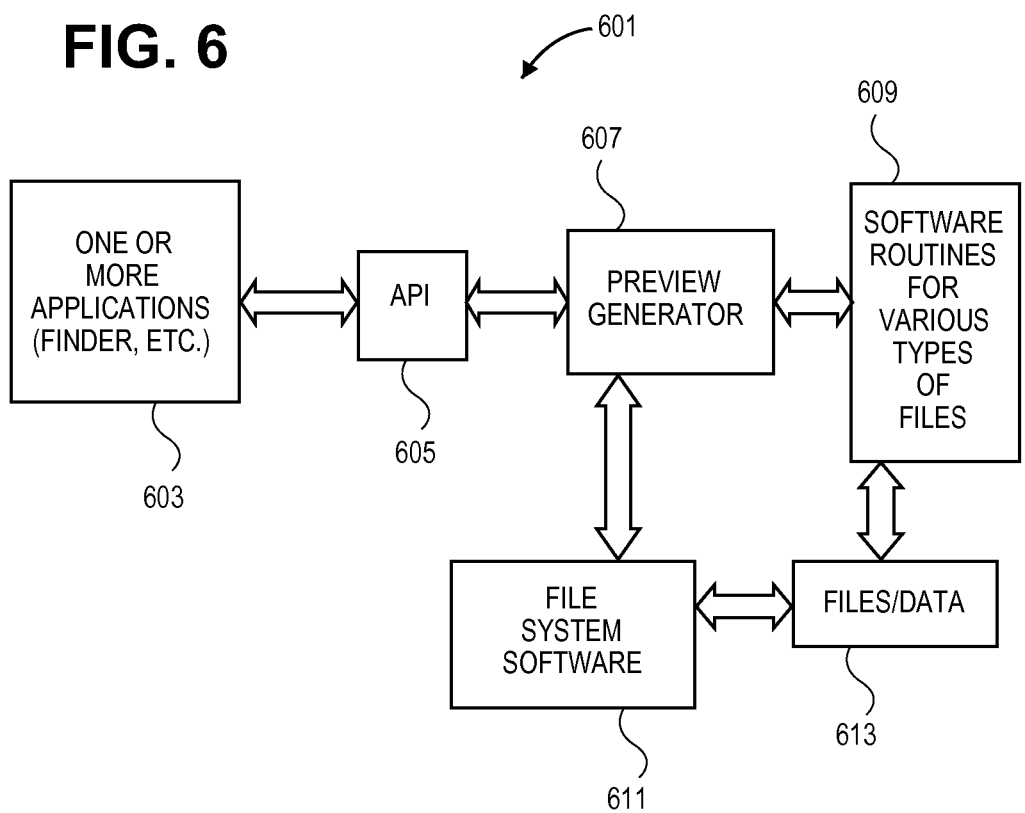
FIG. 6 is an example of a software architecture which can be used to generate previews of the content of one or more files according to an embodiment of the present invention.

In one embodiment, a non-native application, such as the preview generator shown in FIG. 6, can be configured to present a preview of each of these various different types of files without invoking or launching the native application which is capable of creating or modifying the corresponding file. Typically, the non-native application will not be able to create or modify the file but can present the file for viewing, and hence the preview generator can be considered to be a reader or viewer application to present the content of the file in a preview mode.

Figure 3B:
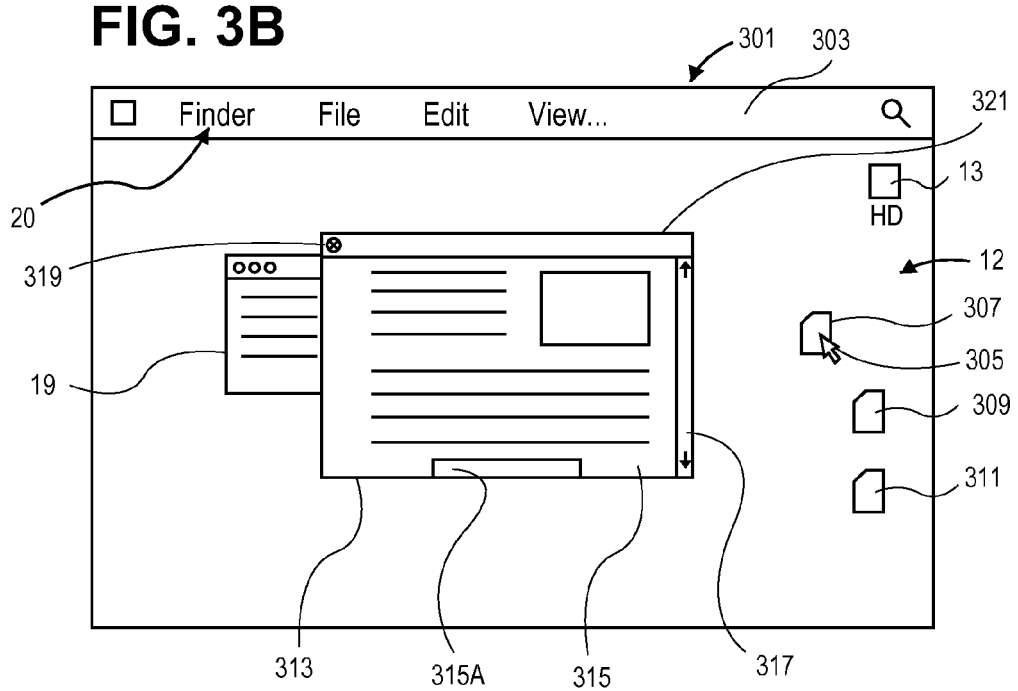

In the example shown in FIGS. 3A and 3B, the user has selected the file represented by the icon 307 by positioning the cursor 305 over the icon 307 and has caused the selection of the file and has further provided a command to the system to present a preview of the content of the file. The result of processing that command is shown in FIG. 3B in which preview window or panel 313 is displayed and shows the content 315 of the file represented by icon 307. The preview window 313 includes a preview top bar 321 and scroll controls 317, allowing a user to scroll up and down to see the entire content of the file. Preview top bar 321 can be selected by a user and caused to be moved, thereby moving preview window 313 over the desktop 12. Preview window 313 also includes a close icon 319 which the user can select to close the preview window 313 to cause it to disappear from the desktop 312. Content 315 includes a lower portion 315A which cannot be fully seen in FIG. 3B but can be seen in FIG. 3D as will be explained further below. It will be understood that the user could have selected another file, rather than the file associated with icon 307; for example, the user could have selected any one of the files shown in window 19 or other files in other windows or could have opened up storage icon 13 and searched or browsed through files contained within the storage represented by storage icon 13, etc. It will be appreciated that the preview shown in FIG. 3B can be considered to be the first preview provided in operation 203 of FIG. 2A.

The user can, after displaying the preview as shown in FIG. 3B, decide to open the file in a native application which can edit or create that particular type of file. For example, the user can double-click within content 315 to cause the command to open the file or the user can double-click on icon 307 or it can provide a key press or a plurality of key presses through a keyboard or it can use a touch input such as one or more gestures with a user's finger in order to cause the file to be opened. The result of the beginning of the process of opening the file is shown in FIG. 3C. At this point, the native application has not been fully launched, and hence the menu bar for the native application is not present and other user interface features and components of the native application are also not present. Unlike the prior art, the preview of the content remains during the launching process; that is, it remains presented on desktop 12, and in the embodiment shown in FIG. 3C, it is enlarged relative to preview window 313 but both windows 325 and window 313 are centered about the same location. Because the content of the file remains displayed after receiving the open command and is displayed during the opening process and launching process for the native application, the viewer or user is not distracted by an interruption of the display of the content of the file, which would occur in the prior art. If the user interface shown in FIGS. 3A-3D includes a dock, which is a known feature of the Macintosh operating system, then the user would be able to see that the native application is in the process of being launched while the content of the file is being displayed as shown in FIG. 3C.

Window 325 can have no border as is shown in FIG. 3C although in other embodiments it can have a border such as a thin frame surrounding the display of the content of the file. It will be understood that if the content fills preview window 313 then the window 325 can be of the same size as window 313. In one embodiment, the display of the content 315 occurs during the entire process of opening the file and launching the application, beginning with the open command and ending with the completion of the launch process for the native application. FIG. 3D shows the result of the completion of the launch of the native application ("NativeApp"). At this point in time, the file has been opened within the native application and is being presented along with the user interface of the native application. From the user's perspective, the user has observed the file in the preview mode and then caused the file to be opened, and during the process for opening of the file and launching the native application, the content of the file has been continuously displayed, in one embodiment, to the user and it appears as if the user interface is wrapped around the content during the process of launching the application. In one embodiment, there is no substantial interruption in the display or presentation of the content between the time at which the user invokes the open command and the time at which the native application completes its launch process. At the end of the launch process, the native application's user interface is now displayed, including menu bar 335 which includes one or more menu options such as menu option 337 ("Format") to select format commands and program menu 336 ("NativeApp") to select commands for the program, and tool bar 343 and tool panel 345. In addition, window 325 is surrounded by scroll controls, such as vertical scroll controls 349 and horizontal scroll controls 347. Content 315 is still displayed within window 325 as it was during the launch process when the second preview was shown as in FIG. 3C and operation 207 of FIG. 2A. Window 325 now includes window controls 341 which can be conventional controls to allow a user to close a window, minimize a window, or expand a window, etc. Window 325 can also now include a resize icon 350 which can be a conventional resize control on windows as is known in the art.

The sequence of FIGS. 3A, 3B, 3E, and 3F represent another embodiment in which the first preview (such as the first preview referred to in operation 203) is transformed into an enlarged and moved preview, which can be a second preview as in operation 207 of FIG. 2A. In this embodiment, the user can begin as shown in FIG. 3A and select a file as shown in FIG. 3B and invoke a preview command to cause the display of the preview of the content of the file without invoking the native application to present the file. Then the user can enter a command to launch the application and open the file within the application, and during the launch process, the second preview is displayed as shown in FIG. 3E; in this case, the second preview is enlarged and moved relative to the first preview shown in FIG. 3B, and this second preview is displayed while the native application is being launched. Again, it will appear to the user, in one embodiment, as if the content is always presented or displayed (but perhaps moved) from the beginning of the open command until the native application has completed its launch process and has opened the file. The result of opening the file and completing the launch process is shown in FIG. 3F. After the completion of the launch process for a NativeApp, the user interface for the NativeApp appears wrapped around window 325A.

An example of the method of FIG. 2C will now be provided in conjunction with FIGS. 3A, 3C, and 3D. Operation 241 displays at least one of an icon or a name of a file in a user interface, and it can be seen that three icons for three files are displayed on desktop 12 and names or icons of files are displayed in window 19. The user can select one of those files to cause the file to be opened in a native application as in operation 243, and this will result, in operation 245, in the activation of a non-native application, such as the preview generator shown in FIG. 6, to cause the presentation of window 325 as shown in FIG. 3C while the native application is launching. Hence, the content of the file is presented as soon as possible after launch, in one embodiment, by the preview generator and before the native application completes its launch process as shown in FIG. 3D. In one embodiment, there can be no substantial interruption in the presentation of the content during the launch process. The window 325 may have no border or a border which is replaced by the border and other user interface features of the native application as shown in FIG. 3D and as shown by the transition from FIG. 3C to 3D.

FIGS. 4A, 4B, 4C, and 4D show an example of a method according to the embodiment of FIG. 2B in which a display state is passed from the preview mode, which can use a non-native application, to a native application. It will be appreciated that, in one embodiment, the passing of the display state can occur whether or not a preview is actually being concurrently displayed when the file is selected to be opened. The embodiment shown in FIGS. 4A-4D assumes that the preview mode has been invoked and that a preview is being displayed prior to receiving the command to open the file in the native application. It will also be appreciated that there could be a change in size or position or both in going from the preview window to the native application's window; in the embodiment shown in FIGS. 4A-4D, there is no change in size or position.

Figure 4A:
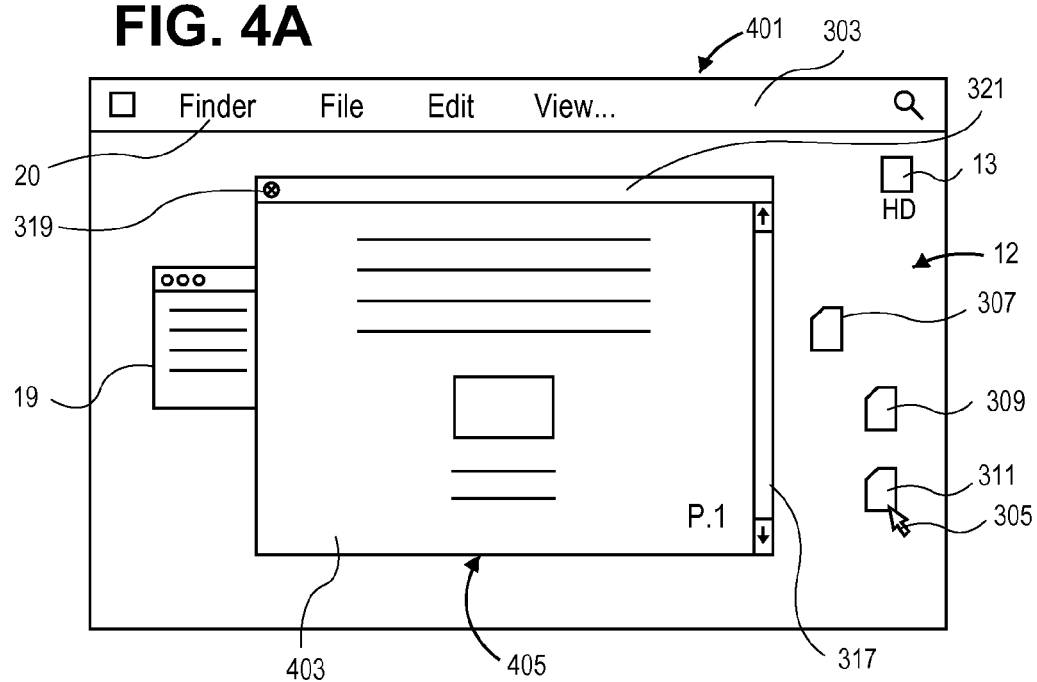
FIGS. 4A, 4B, 4C, and 4D show another example of a user interface according to another embodiment of the present invention which involves passing of a display state from the preview mode to the native application mode.
Figure 4B:
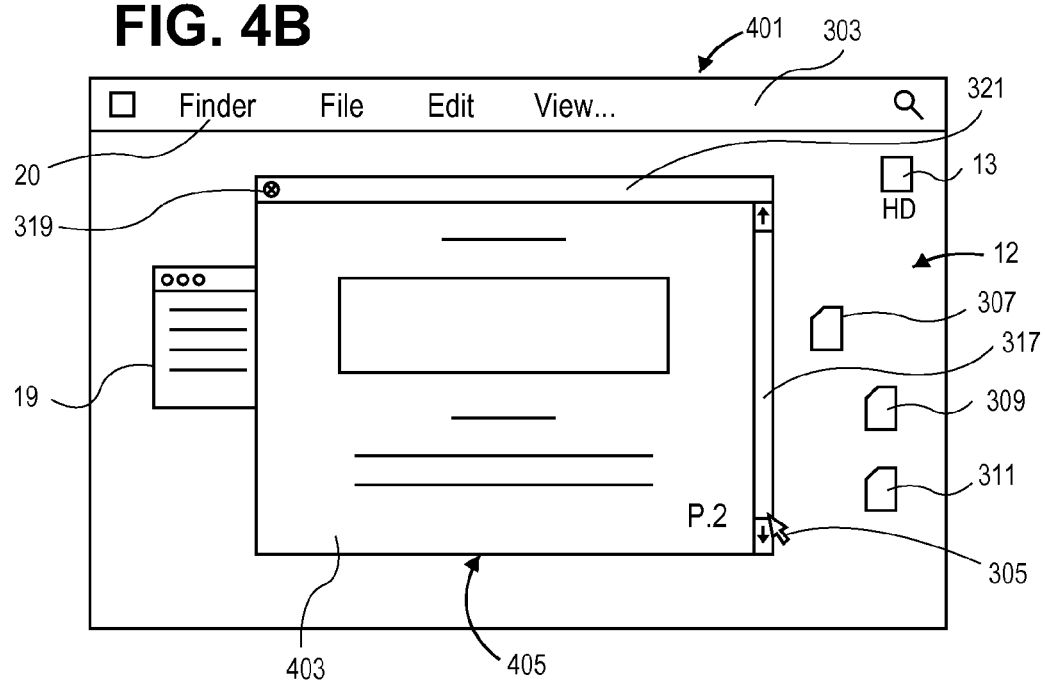
Figure 4C:
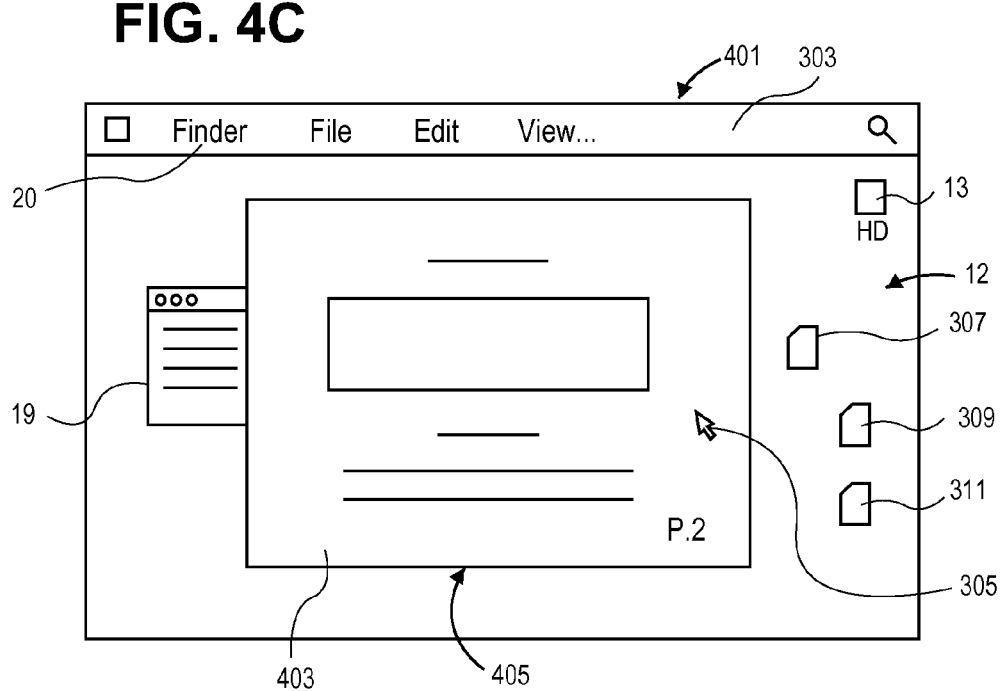

Each of FIGS. 4A, 4B, 4C, and 4D represent one stage of a user interface on a display screen 401. In FIG. 4A, a user has selected a file, such as the file represented by icon 311, and has requested that the system provide a preview of the content of the file which is shown within window 405 as content 403. Content 403 shows page 1 of the content of the file. Vertical scroll controls 317 allow a user to change the viewing position or display state of the preview by scrolling either up or down. In some embodiments, the scrolling may be merely up and down as in the case of FIG. 4A, or up and down and also horizontally or just horizontally, depending upon the environment and the content of the file. The scroll controls allow a user, in the embodiment shown in FIGS. 4A and 4B, to change the vertical viewing position of the file, which the user has done in this case by positioning cursor 305 over the down arrow in window 405, causing page 2 of content 403 to be revealed as shown in FIG. 4B. The presentation of the preview shown in FIGS. 4A and 4B may be through a non-native application which cannot, in one embodiment, edit or create the file being presented, and can be created through the preview generator described in connection with FIG. 6. While viewing the user interface shown in FIG. 4B, the user can then invoke a command to open the file associated with icon 311. In one embodiment, the user can move cursor 305 into content 403 within the window 405 and press a mouse's button twice (a so-called "double-click" action) or can double-click on the icon 311 or can press one or more keys on a keyboard or can input one or more touch gestures on a touch screen, etc. in order to cause the file to be opened. Once the command is received, the system responds by displaying window 405 as shown in FIG. 4C. Note that in this embodiment the border has been removed and the preview top bar has been removed and the scroll controls 317 have been removed while the native application is in the process of launching and opening the file associated with icon 311. In this embodiment, the content is presented substantially uninterrupted during the launch process from the beginning of the launch process to the end of the launch process of the native application Native-AppX. In this embodiment, there is a seamless presentation from the preview mode to the end of the launching process of the content of the file, and the presentation of the content appears substantially uninterrupted from the user's perspective.

Figure 4D:
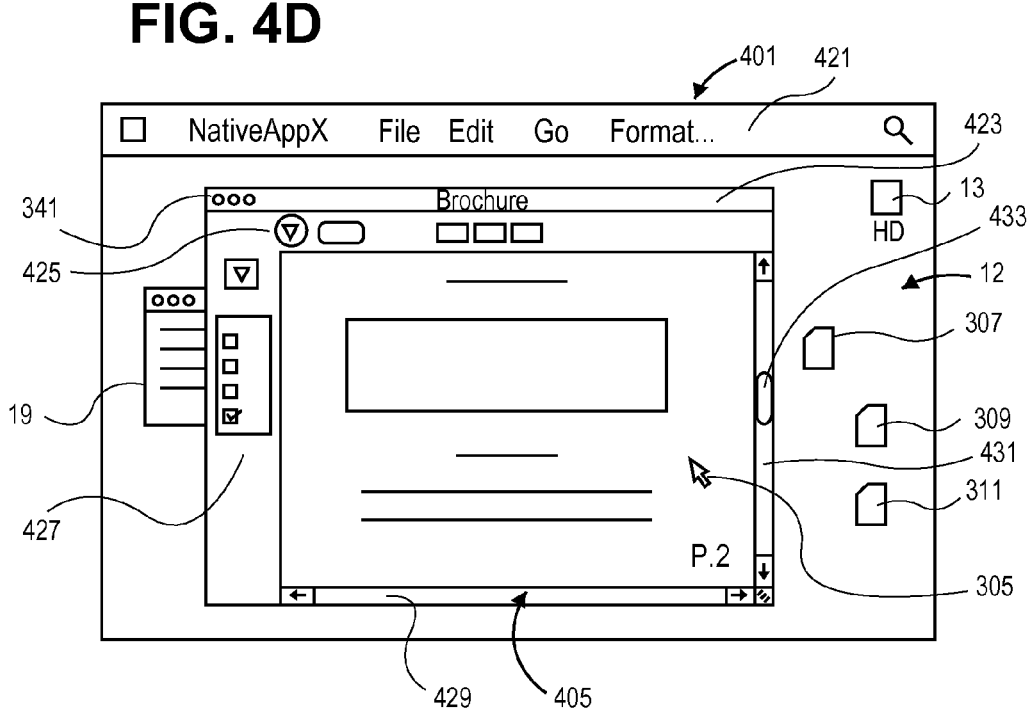

The resulting user interface after the completion of the launching is shown in FIG. 4D, and from the user's perspective, the user interface of NativeAppX appears to have wrapped around window 405 while it was being presented. For example, vertical scroll controls 431 and horizontal scroll controls 429 and tool panel 427 and tool bar 425 and window controls 431 along with the title bar of window 405, which is title bar 423, appear to have been applied or wrapped around content 403 during the launch process while content 403 was, in one embodiment, continuously displayed without interruption during the launch process from the very beginning of the launch process. Unlike the prior art which showed the beginning of the file at page 1 of the file, FIG. 4D shows that, at the end of the launch process, the file is presented at the position last previewed by the user as shown in FIG. 4B. In other words, the display state in the preview mode was passed to the native application. In one embodiment, the passing of the display state may be from the non-native application to the native application. The passing of the display state can include passing a page number, or a scroll position, or a zoom value, or a movie frame number or movie time, or a combination of any one of these values. The passing of the display state can occur through an API. For example, the opening application (in this case, NativeAppX) can place a call to the system or the preview generator requesting a display state from the preview generator which can return display state values, such as page numbers, scroll positions, preview window size or position, etc. to the native application during the launch process.

Figure 5:
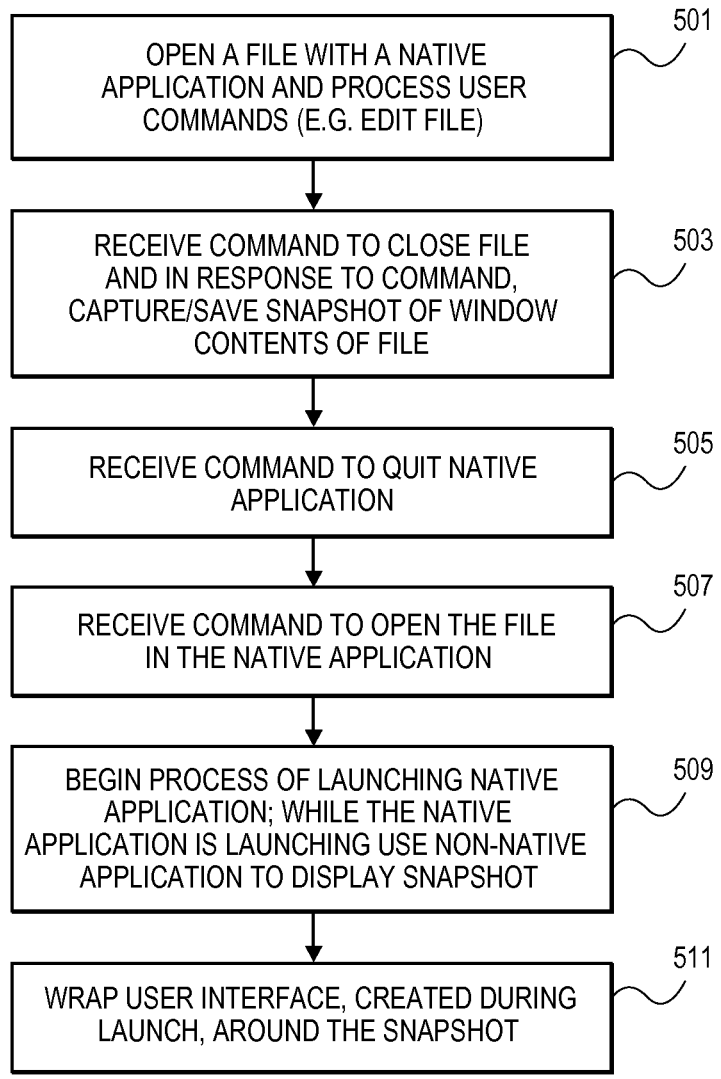
FIG. 5 is a flow chart which shows a method according to an alternative embodiment of the present invention.

FIG. 5 shows an example of a method according to another embodiment of the present invention. In this embodiment, the native application can generate the preview for the system which can then be retrieved by the system as soon as possible or when desired after the native application has been launched. The method shown in FIG. 5 can begin in operation 501 in which a file is opened with a native application and the system processes user commands, such as commands to edit the file or create the file, etc. When the user is done, the user will typically close the file, in which case the system will receive a command to close the file in operation 503 and in response to the command, the native application will save a snapshot of the window of the contents of the file which can be used later at launch time in operation 509 described below. Then in operation 505, the system can receive a command to quit the native application, which can then be later opened again in operation 507 when the file is opened again. In response to launching the native application to open the file again, a non-native application can use the previously saved snapshot to display a preview of the content of the file while the non-native application is launching in operation 509. During a launch process, the user interface of the native application can be wrapped around the snapshot as the launch process proceeds, in operation 511.

In one embodiment, when a file is closed, it can seamlessly transition from the opened state back to the location from which it was opened. If the location is visible (e.g., the location is an icon on the desktop), the file can be closed by a zooming animation which shrinks from the window, showing the opened file, in a native application to the icon on the desktop. If the location is not visible (e.g., the location is within a folder that is closed) then the file can be closed by a zooming animation which shrinks from the window, showing the opened file, in a native application to an icon, representing the file, which is located near the center point of the window, and then the icon can disappear from view. In this embodiment, the file can appear to close to its origination point, which can give the appearance of a seamless closing to match, in reverse, the seamless opening described herein. A system in one embodiment can implement either seamless closing or seamless opening or both.

FIG. 6 shows an example of a software architecture 601 which may be used to dynamically generate previews such as one or both of the first and second preview in the method of FIG. 2A or the preview of the method of FIG. 2B or the preview of the method of FIG. 2C. This architecture may include one or more APIs, such as API 605, to act as an interface between separate software programs. For example, API 605 acts as an interface between preview generator 607, which may be a preview generator daemon provided by an operating system software, and one or more application programs 603, such as the Finder which is a user interface for a file management software or a search software program or other programs, etc. The one or more application programs 603 can make calls, through the API 605, in order to have a preview generated for a file or other item in a particular view. The Finder or other programs can make a call to have a preview generated in response to either a preview command or a command to open the file. The preview generator 607 can be configured to receive those calls to generate a preview of the content. In one embodiment, the preview of the content can be generated by requesting a software routine (such as a first plug-in) in a set of software routines 609 to generate either displayable content or data in a standard format. Each routine in the set can be configured to generate the content of at least one file type (e.g. PDF or XLS, etc.) so the set can collectively be able to provide previews for a large number of different file types. The first plug-in may be loaded and then can process the file associated with the call to generate the preview. The preview generator may determine the file type of the file by making a call, to determine the file type to the file system software 611, which returns an identifier of the file type of the file, and then the preview generator 607 may match the file type with the most appropriate routine in the set of software routines 609 before causing the most appropriate routine to be loaded to generate the preview. Each software routine in software routines 609 may include data identifying the file types it can process and the ability to retrieve the files or data 613 through the use of file system software 611. The preview generator can receive the preview of the content from the software routines and then supply that to the one or more applications which requested the preview, such as the Finder application.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 7:
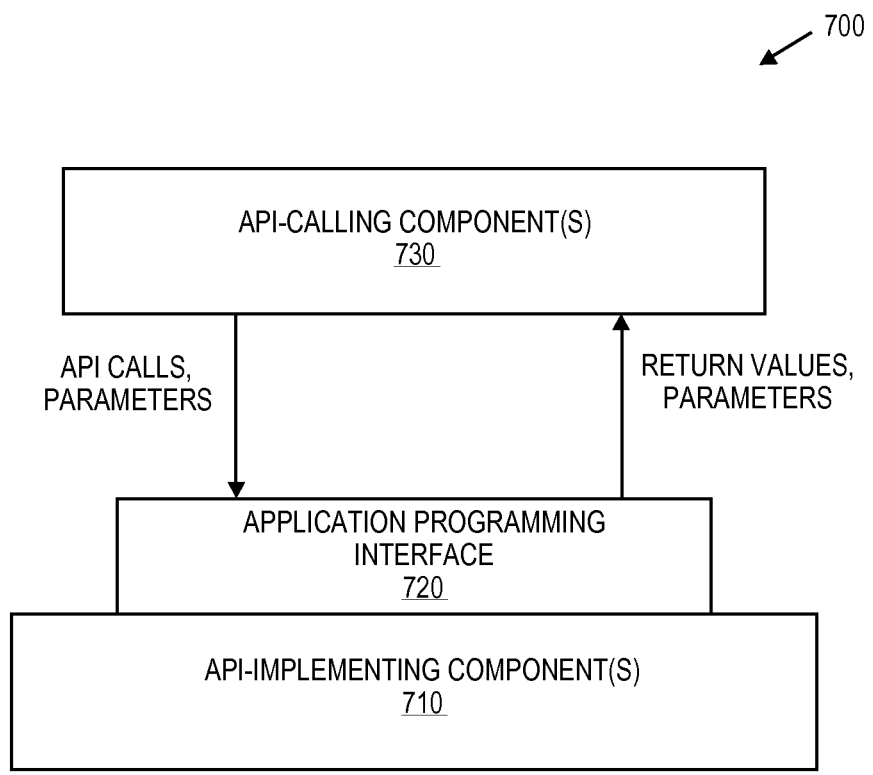
FIG. 7 illustrates a block diagram of an exemplary API architecture which is useable in some embodiments of the invention.

FIG. 7 is a block diagram illustrating an exemplary API architecture, which may be used in some embodiments of the invention. As shown in FIG. 7, the API architecture 700 includes the API-implementing component 710 (e.g., an operating system, a library, a device driver, an API, an application program, software or other module) that implements the API 720. The API 720 specifies one or more functions, methods, classes, objects, protocols, data structures, formats and/or other features of the API-implementing component that may be used by the API-calling component 730. The API 720 can specify at least one calling convention that specifies how a function in the API-implementing component receives parameters from the API-calling component and how the function returns a result to the API-calling component. The API-calling component 730 (e.g., an operating system, a library, a device driver, an API, an application program, software or other module), makes API calls through the API 720 to access and use the features of the API-implementing component 710 that are specified by the API 720. The API-implementing component 710 may return a value through the API 720 to the API-calling component 730 in response to an API call.

It will be appreciated that the API-implementing component 710 may include additional functions, methods, classes, data structures, and/or other features that are not specified through the API 720 and are not available to the API-calling component 730. It should be understood that the API-calling component 730 may be on the same system as the API-implementing component 710 or may be located remotely and accesses the API-implementing component 710 using the API 720 over a network. While FIG. 7 illustrates a single API-calling component 730 interacting with the API 720, it should be understood that other API-calling components, which may be written in different languages (or the same language) than the API-calling component 730, may use the API 720.

The API-implementing component 710, the API 720, and the API-calling component 730 may be stored in a tangible machine-readable storage medium, which includes any mechanism for storing information in a form readable by a machine (e.g., a computer or other data processing system). For example, a tangible machine-readable storage medium includes magnetic disks, optical disks, random access memory (e.g. DRAM); read only memory, flash memory devices, etc.

Figure 8:
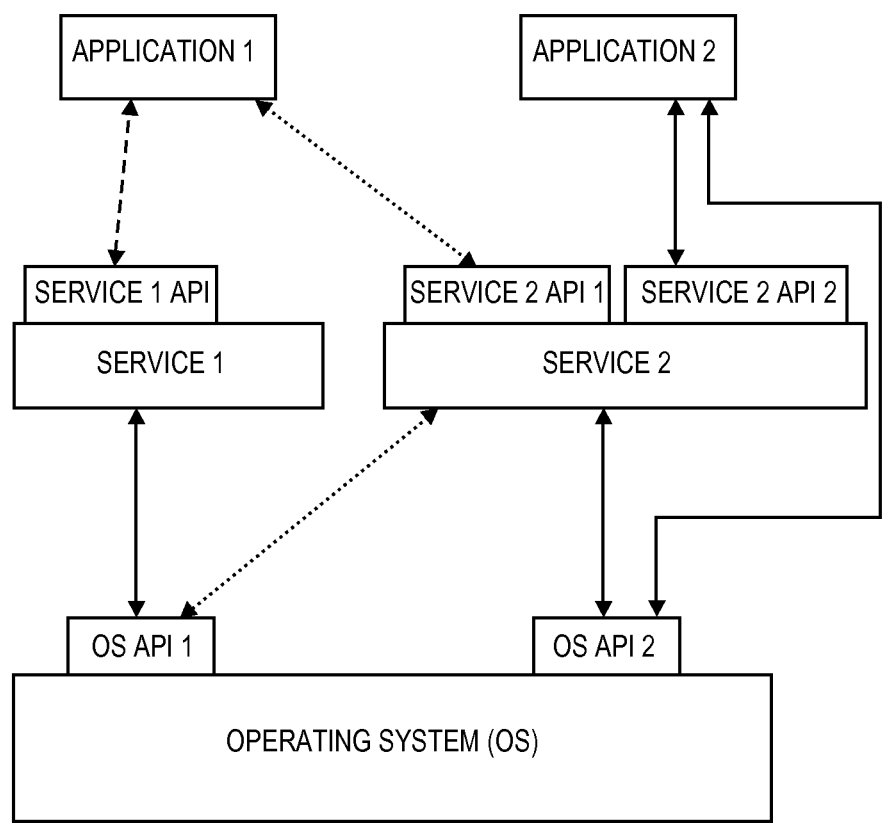
FIG. 8 is an exemplary embodiment of an API architecture useable in some embodiments of the invention.

In FIG. 8 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 9:
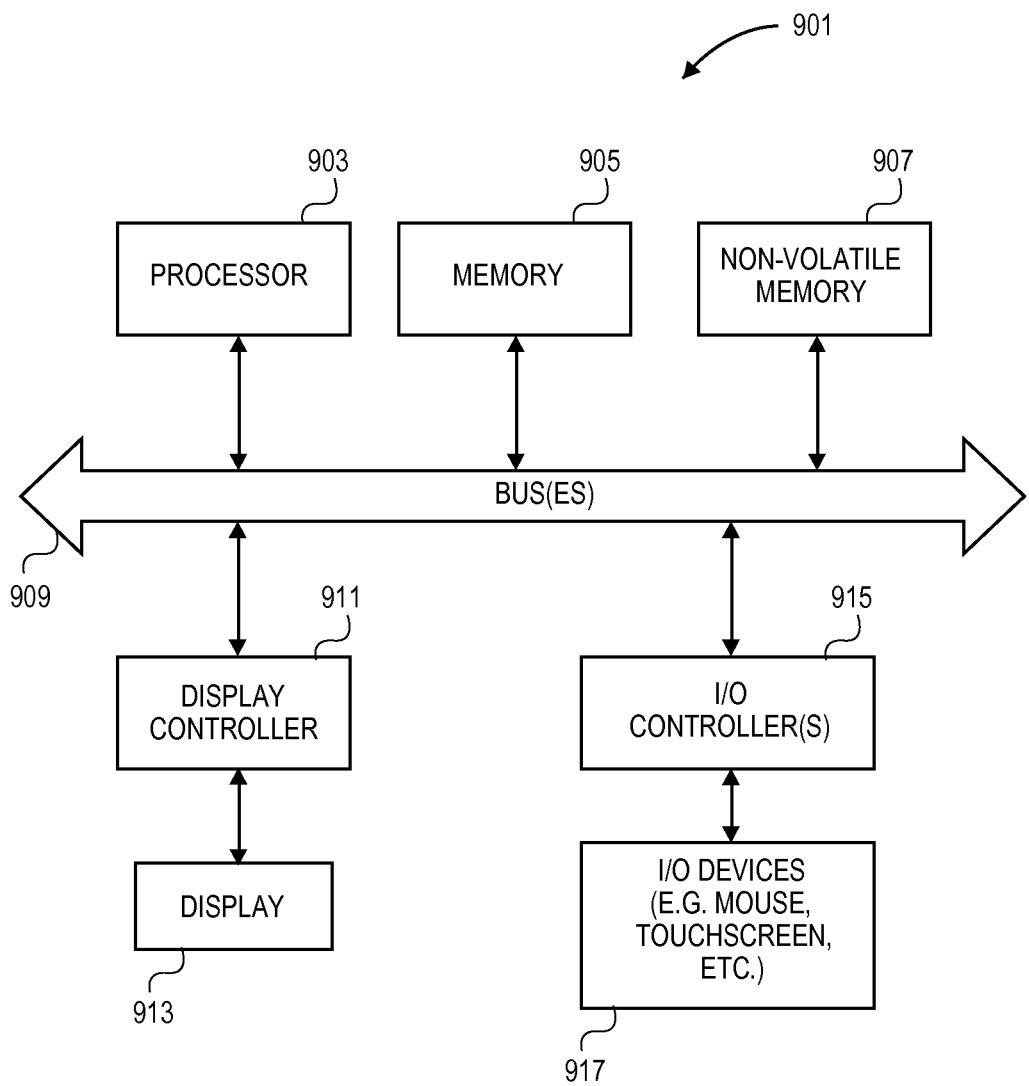
FIG. 9 is an example of a data processing system which can be used to implement one or more of the embodiments described herein.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 9 shows one example of a typical data processing system which may be used with the present invention. Note that while FIG. 9 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 9 may also be used with the present invention. The data processing system of FIG. 9 may be a Macintosh computer from Apple Inc. of Cupertino, Calif. As shown in FIG. 9, the data processing system 901 includes one or more buses 909 which serve to interconnect the various components of the system. One or more processors 903 are coupled to the one or more buses 909 as is known in the art. Memory 905 may be DRAM or non-volatile RAM or may be flash memory or other types of memory. This memory is coupled to the one or more buses 909 using techniques known in the art. The data processing system 901 can also include non-volatile memory 907 which may be a hard disk drive or a flash memory or a magnetic optical drive or magnetic memory or an optical drive or other types of memory systems which maintain data even after power is removed from the system. The non-volatile memory 907 and the memory 905 are both coupled to the one or more buses 909 using known interfaces and connection techniques. A display controller 911 is coupled to the one or more buses 909 in order to receive display data to be displayed on a display device 913 which can display any one of the user interface features or embodiments described herein. The display device 913 can include an integrated touch input to provide a touch screen. The data processing system 901 can also include one or more input/output (I/O) controllers 915 which provide interfaces for one or more I/O devices, such as one or more mice, touch screens, touch pads, joysticks, and other input devices including those known in the art and output devices (e.g. speakers). The input/output devices 917 are coupled through one or more I/O controllers 915 as is known in the art. While FIG. 9 shows that the non-volatile memory 907 and the memory 905 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 909 may include one or more bridges or controllers or adapters to interconnect between various buses. In one embodiment, the I/O controller 915 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a memory such as the memory 905 or the non-volatile memory 907 or a combination of such memories and each of these memories is a form of a machine readable, tangible storage medium. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method comprising:
receiving a command to display a first preview of a file, the display being provided by a non-native application, and the first preview including a representation of at least a portion of content of the file;
displaying the first preview in the non-native application;
receiving a command to open the file in a native application;
maintaining, after receiving the command to open and while processing the command to open, display of the representation of the content of the file, the representation being one of the first preview or a second preview;
generating, while continuously maintaining display of the representation of the content, a user interface of the native application around the representation of the portion of the content of the file, the user interface including a window frame of the native application for the content; and
displaying the user interface of the native application around the representation of the content of the file;
wherein the displaying of the first preview and the displaying of the user interface of the native application occurs such that the representation of the content of the file is displayed without any user perceptible interruption.

2. The method as in claim 1, wherein the second preview is one of (a) an enlarged version of the first preview or (b) a version of the content generated by the native application.

3. The method as in claim 2 wherein the displaying of the first preview and the displaying of the representation of the content occur seamlessly over time such that a user will perceive no interruption in the display of content of the file.

4. The method as in claim 3 wherein the non-native application is configured to display content of a plurality of file types, including picture files, text files, movie files, spreadsheet files, PowerPoint slide files, and wherein the non-native application cannot edit or create content of the plurality of file types.

5. The method of claim 3 wherein the first preview has a first border or no border that is replaced by the window frame of the native application.

6. The method of claim 3 wherein the displaying of the representation of the content of the file includes moving the first preview and expanding the first preview into the second preview and then adding the user interface, including the window frame, of the native application.

7. The method of claim 3 wherein the second preview is positioned at a last save state when the content was last viewed in the native application.

8. The method as in claim 2 further comprising:
suppressing a splash screen which would cover the representation of the content.

9. The method as in claim 2 further comprising:
passing a display state of the first preview from the non-native application to the native application, the display state indicating at least one of:
(a) a viewing position on the content of the file, or
(b) a size of the first preview.

10. A machine readable, non-transitory, tangible storage medium storing executable instructions that cause a data processing system to perform a method comprising:
receiving a command to display a first preview of a file, the display being provided by a non-native application, and the first preview including a representation of at least a portion of content of the file;
displaying the first preview in the non-native application;
receiving a command to open the file in a native application;
maintaining, after receiving the command to open and while processing the command to open, display of the representation of the content of the file, the representation being one of the first preview or a second preview;
generating, while continuously maintaining display of the representation of the content, a user interface of the native application around the representation of the content of the file, the user interface including a window frame of the native application for the content; and
displaying the user interface of the native application around the representation of the content of the file;
wherein the displaying of the first preview and the displaying of the user interface of the native application occurs such that the representation of the content of the file is displayed without any user perceptible interruption.

11. The medium as in claim 10, wherein the second preview is one of (a) an enlarged version of the first preview or (b) a version of the content generated by the native application.

12. The medium as in claim 11 wherein the displaying of the first preview and the displaying of the representation of the content occur seamlessly over time such that a user will perceive no interruption in the display of content of the file.

13. The medium as in claim 12 wherein the non-native application is configured to display content of a plurality of file types, including picture files, text files, movie files, spreadsheet files, PowerPoint slide files, and wherein the non-native application cannot edit or create content of the plurality of file types.

14. The medium of claim 12 wherein the first preview has a first border or no border that is replaced by the window frame of the native application.

15. The medium of claim 12 wherein the displaying of the representation of the content of the file includes moving the first preview and expanding the first preview into the second preview and then adding the user interface, including the window frame, of the native application.

16. The medium of claim 12 wherein the second preview is positioned at a last save state when the content was last viewed in the native application.

17. The medium as in claim 11, the method further comprising:
suppressing a splash screen which would cover the representation of the content.

18. The medium as in claim 11, the method further comprising:
passing a display state of the first preview from the non-native application to the native application, the display state indicating at least one of:
(a) a viewing position on the content of the file, or
(b) a size of the first preview.

19. A machine readable, non-transitory, tangible storage medium storing executable instructions that cause a data processing system to perform a method comprising:
displaying a file in a preview mode by a non-native application, the file being displayed in a display state by the non-native application, the display state representing at least a viewable portion of the file in the preview mode;
receiving a command to open the file in a native application;
passing the display state in the preview mode from the non-native application to the native application;
displaying the file in the native application based on the display state such that the user interface of the native application is displayed around the viewable portion of the file;
wherein the displaying of the preview mode and the displaying of the user interface of the native application occurs such that the viewable portion of the file is displayed without any user perceptible interruption.

20. The medium as in claim 19 wherein the display state comprises at least one of (a) a page number; (b) a scroll position; (c) a movie frame number or movie time.

21. The medium as in claim 19 wherein the passing of the display state occurs in response to the command to open the file.

22. The medium as in claim 21 wherein the file is displayed in the preview mode in response to a first input and the command is invoked by a second input which is different than the first input.

23. The medium as in claim 22 wherein content of the file cannot be edited or created by the non-native application.

24. The medium as in claim 23 wherein the non-native application is a user interface program for a file management system.

25. A machine implemented method comprising:
displaying a file in a preview mode by a non-native application, the file being displayed in a display state by the non-native application, the display state representing at least a viewable portion of the file in the preview mode;
receiving a command to open the file in a native application;
passing the display state in the preview mode from the non-native application to the native application;
displaying the file in the native application based on the display state such that the user interface of the native application is displayed around the viewable portion of the file;
wherein the displaying of the preview mode and the displaying of the user interface of the native application occurs such that the viewable portion of the file is displayed without any user perceptible interruption.

26. The method as in claim 25 wherein the display state comprises at least one of (a) a page number; (b) a scroll position; (c) a movie frame number or movie time.

27. The method as in claim 25 wherein the passing of the display state occurs in response to the command to open the file.

28. The method as in claim 27 wherein the file is displayed in the preview mode in response to a first input and the command is invoked by a second input which is different than the first input.

29. The method as in claim 28 wherein content of the file cannot be edited or created by the non-native application.

30. The method as in claim 29 wherein the non-native application is a user interface program for a file management system.

* * * * *